2,905,672

PYRIDAZINE ETHERS AND THIOETHERS, AND PREPARATION THEREOF

Edgar Alfred Steck, Metuchen, N.J., assignor to Sterling Drug Inc., New York, N.Y., a corporation of Delaware No Drawing. Application January 21, 1955
Serial No. 483,417

17 Claims. (Cl. 260—250)

This invention relates to pyridazine ethers and thioethers having the formula

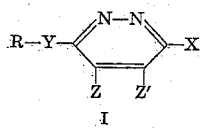

wherein R is a lower-alkyl, monocarbocyclic aryl, or a monocarbocyclic aryl-lower-alkyl group; Y is oxygen or sulfur; X is chlorine, bromine or Y'—R', wherein Y' is sulfur and R' is a lower-alkyl, monocarbocyclic aryl, or a monocarbocyclic aryl-lower-alkyl group; and Z and Z' are hydrogen or lower-alkyl groups. The invention also relates to the preparation of these compounds.

The compounds of the invention wherein X of the above general Formula I is Y'—R', wherein Y' and R' have the meanings given above, are pharmacological agents, and in particular they possess sedative action. The compounds wherein X is chlorine or bromine are useful as starting materials in the preparation of compounds where X is Y'—R', and are particularly valuable for the preparation of unsymmetrical compounds wherein Y' and R' are different from Y and R respectively.

In the above general Formula I, and the definitions following that formula, the groups R and R' represent lower-alkyl groups, monocarbocyclic aryl groups or monocarbocyclic aryl-lower-alkyl groups. When R and R' represent lower-alkyl groups, they can be straight or branched and preferably contain from one to about six carbon atoms, thus including such groups as methyl, ethyl, propyl, isopropyl, butyl, tertiary-butyl, isobutyl, pentyl, isopentyl, hexyl, isohexyl, and the like. When the groups R or R' represent monocarbocyclic aryl groups, they are radicals of the benzene series and can be an unsubstituted phenyl group or a phenyl group substituted by one or more substituents inert to the reaction conditions and reagents used in the process for preparing the compounds. Such inert substituents include lower-alkyl, lower-alkoxy, halogen, dialkylamino, carboxy, trifluoromethyl, and the like groups. However, groups susceptible to reaction with halopyridazines, such as primary or secondary amino, hydroxy or mercapto, are not suitable as substituents in the monocarbocyclic aryl group. A preferred class of monocarbocyclic aryl groups consists of phenyl and phenyl substituted by from one to three lower-alkyl, lower-alkoxy, halogen or carboxy groups, and if two or more substituents are present they can be the same or different and in any of the various positions relative to one another. The lower-alkyl and lower-alkoxy groups preferably have from one to about four carbon atoms and thus include methyl, ethyl, propyl, isopropyl, butyl, isobutyl, methoxy, ethoxy, propoxy, isopropoxy, butoxy, isobutoxy, and the like. The term lower-alkoxy includes the methylenedioxy group, —OCH₂O—. The halogen substituents can be any of the four halogens, fluorine, chlorine, bromine or iodine. Illustrative examples of the aryl group include phenyl, p-tolyl, p-ethylphenyl, m-butylphenyl, 3,4-methylenedioxyphenyl, o-ethoxyphenyl, m-propoxyphenyl, p-butoxyphenyl, 3,4-dimethoxyphenyl, 2-methyl-4-methoxyphenyl, o-chlorophenyl, p-bromophenyl, 3,4-dichlorophenyl, o-carboxyphenyl, p-carboxyphenyl, and the like. When the group R or R' represents monocarbocyclic aryl-lower-alkyl groups, they include the lower-alkyl groups of the type hereinbefore defined substituted by the monocarbocyclic aryl groups also of the type hereinbefore defined, thus including such groups as benzyl, 2-phenylethyl, 1-phenylethyl, 2-chlorobenzyl, 3,4-dimethoxybenzyl, 3-phenylpropyl, p-carboxybenzyl, and the like.

In the above general Formula I, X represents a halogen atom selected from chlorine or bromine, or the grouping Y'—R', wherein Y' and R' have the same meanings as given hereinabove. In a given compound Y' and R' can be the same as Y and R or they can be different.

In the above general Formula I, Z and Z' represent hydrogen atoms or lower-alkyl groups, and they can be the same or different. When Z or Z' or both are lower-alkyl groups they can be straight or branched and preferably have from one to about four carbon atoms, thus including such groups as methyl, ethyl, propyl, isopropyl, butyl, isobutyl, and the like.

The compounds of Formula I wherein X is chlorine or bromine or Y'—R' can be prepared by heating a 3,6-dihalopyridazine having the formula

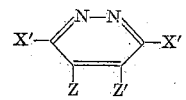

wherein X' is chlorine or bromine with a compound having the formula R—Y—M wherein M is an alkali metal. The heating can be carried out at any temperature between about 50° C. and about 200° C. If there is used a relatively low temperature, under about 100° C., and/or one molar equivalent of alkali metal derivative, the major product comprises a compound of Formula I in which X is chlorine or bromine; in other words, where only one halogen atom of the starting 3,6-dihalopyridazine has been replaced. If there is used a relatively high temperature, above about 100° C., and two or more equivalents of alkali metal derivative, the compounds of Formula I wherein X is Y'—R' are obtained, both halogen atoms of the 3,6-dihalopyridazine being replaced. In this case Y' and R' are identical with Y and R, respectively. In some instances mixtures of the monoether and bisether are obtained, and they can be separated by fractional crystallization or the like procedures. The reaction can be carried out in the presence of an excess of the alcohol, phenol or thiol, R—Y—H, from which the alkali metal derivative, R—Y—M, is derived, or in the presence of other solvents or suspending media inert under the conditions of the reaction herein set forth, such as benzene, xylene, toluene, or the like. In the cases where R is an aryl group, the starting material is an alkali metal derivative of a phenol or thiophenol which forms readily in aqueous medium by treatment of said phenol or thiophenol with an alkali metal hydroxide. In these cases, therefore, an aqueous reaction medium can be used. If the group R or R' is a monocarbocyclic aryl group containing a carboxy group, another equivalent of alkali metal or alkali metal hydroxide must be used to neutralize the carboxy group. The free carboxy group can be regenerated by acidification after the reaction has taken place.

If unsymmetrical substituted bis-ethers are desired, i.e., where X is Y'—R', Y' and/or R' differing from Y and/or R, respectively, a dihalopyridazine is first reacted with one equivalent of an alkali metal derivative, R—Y—M, to replace one halogen atom by the group R—Y. The resulting 3-halo-6-(R—Y)-pyridazine is then reacted with a different alkali metal derivative, R'—Y'—M, to replace the remaining halogen atom.

The compounds of the invention are basic in character and can be prepared and used in the form of crystalline, water-soluble acid-addition salts, the anions of which are non-toxic to animal organisms in therapeutic doses of the salts, and these salts are also within the purview of the invention. Appropriate acid-addition salts are those derived from mineral acids such as hydrochloric acid, hydrobromic acid, hydriodic acid, nitric acid, phosphoric acid and sulfuric acid, and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate and lactate salts respectively.

The invention is illustrated by the following examples without however being limited thereto.

EXAMPLE 1

3-chloro-6-methoxypyridazine

A solution of 16.2 g. (0.3 mole) of sodium methoxide in 100 cc. of methanol was gradually added to a stirred refluxing solution of 44.7 g. (0.3 mole) of 3,6-dichloropyridazine in 100 cc. of methanol. After the initial vigorous reaction had moderated, the reaction mixture was refluxed for two hours, then cooled, and the sodium chloride which had precipitated was removed by filtration. The filtrate was concentrated in vacuo, and the residue (39.2 g.) was recrystallized twice from hexane giving 3-chloro-6-methoxypyridazine in the form of colorless platelets, M.P. 88–88.5° C.

*Analysis.*—Calcd. for $C_5H_5ClN_2O$: Cl, 24.53; N, 19.38. Found: Cl, 24.53; N, 19.24.

3-chloro-6-methoxypyridazine was obtained in the form of its hydrochloride salt by treatment of the free base with an ethanol-ether solution of hydrogen chloride. The hydrochloride salt was obtained in the form of colorless needles, M.P. 118–119° C. (dec.), when recrystallized from an ethanol-ether mixture.

*Analysis.*—Calcd. for $C_5H_5ClN_2O \cdot HCl$: Cl(ionic), 19.59; N, 15.48. Found: Cl(ionic), 19.39; N, 15.48.

3-(p-bromobenzylmercapto)-6-methoxypyridazine can be prepared by heating sodium p-bromobenzylmercaptide with 3-chloro-6-methoxypyridazine in xylene solution at about 140° C.

EXAMPLE 2

3,6-dimethoxypyridazine

Sodium methoxide was prepared from 5.06 g. (0.22 mole) of finely divided sodium and 7.1 g. (0.22 mole) of methanol in 200 cc. of dry xylene. To the refluxing suspension of sodium methoxide in xylene there was added over a period of about thirty minutes a solution of 14.8 g. (0.1 mole) of 3,6-dichloropyridazine in 75 cc. of dry xylene, and the reaction mixture was stirred under reflux for fourteen hours. The sodium chloride was removed from the reaction mixture by filtration while hot, and the filtrate was concentrated in vacuo. The residue was recrystallized twice from pentane giving 11.7 g. of 3,6-dimethoxypyridazine in the form of colorless needles, M.P. 104.5–105° C.

*Analysis.*—Calcd. for $C_6H_8N_2O_2$: C, 51.42; H, 5.75; N, 19.99. Found: C, 51.83; H, 6.19; N, 20.02.

EXAMPLE 3

(a) 3,6-dichloro-4-methylpyridazine: Methylmaleic anhydride (citraconic anhydride) (22.4 g., 0.2 mole) was added to a solution of 26.0 g. (0.2 mole) of hydrazine sulfate in 30 cc. of water, and the stirred mixture was refluxed for four hours, using a partial take-off arrangement for the removal of water in order to gradually concentrate the reaction mixture and insure completion of the reaction. The mixture was then diluted with 150 cc. of water, and the solid product was collected by filtration and dried, giving 19.0 g. of methylmaleic hydrazide, M.P. 278–280° C. After two recrystallizations from diethylene glycol monomethyl ether, a sample melting at 283–285° C. was obtained.

*Analysis.*—Calcd. for $C_5H_6N_2O_2$: C, 47.61; H, 4.80; N, 22.22. Found: C, 47,69; H, 4.70; N, 22.84.

A mixture of 360 g. (2.76 mole) of methylmaleic hydrazide and 2.4 liters of phosphorus oxychloride was refluxed with stirring for three hours. After removal of the excess phosphorus oxychloride in vacuo, the residue was hydrolyzed in ice water and the mixture was made basic with ammonium hydroxide. The solid product (424.0 g.) was collected by filtration, dried and distilled at 110–112° C. (1 mm.), giving 387.1 g. of 3,6,-dichloro-4-methylpyridazine, M.P. 86–88° C. Recrystallization from water gave a sample melting at 87–88° C.

*Analysis.*—Calcd. for $C_5H_4Cl_2N_2$: C, 36.84; H, 2.47; Cl, 43.5; N, 17.19. Found: C, 36.95; H, 2.75; Cl, 43.6; N, 16.77.

(b) 3-chloro-6-methoxy-4-(or 5)-methylpyridazine was prepared by reacting 3,6-dichloro-4-methylpyridazine with sodium methoxide in methanol according to the manipulative procedure described above in Example 1. The crude product was dissolved in an equal volume mixture of benzene and hexane and passed through a column of activated alumina, and the column was then eluted with hexane. The material eluted from the column was recrystallized repeatedly from hexane and from a benzene-hexane mixture, giving 3-chloro-6-methoxy-4(or 5)-methylpyridazine in the form of colorless needles, M.P. 117–118.5° C.

*Analysis.*—Calcd. for $C_6H_7ClN_2O$: Cl, 22.36; N, 17.67. Found: Cl, 22.64; N, 17.48.

It is not known whether the compound, M.P. 117–118° C., just described, has the methyl group in the 4- or 5-position of the pyridazine nucleus, hence the designation "-4(or 5)." It is, however, a homogeneous entity comprising one of the two possible position isomers. The other position isomer is formed in lesser quantity in the reaction.

EXAMPLE 4

3,6-bis(methylmercapto)pyridazine was prepared by heating 3,6-dichloropyridazine and sodium methylmercaptide in toluene solution according to the manipulative procedure described above in Example 2. There was thus obtained a 96% yield of 3,6-bis(methylmercapto) pyridazine, M.P. 119–120.5° C. A sample when recrystallized from heptane was obtained in the form of colorless blades, M.P. 124.5–125.5° C.

*Analysis.*—Calcd. for $C_6H_8N_2S_2$: N, 16.27; S, 37.22. Found: N, 16.44; S, 36.33.

EXAMPLE 5

3,6-bis(4-chlorophenylmercapto)pyridazine

A solution of 2.5 g. (0.056 mole) of sodium hydroxide in 20 cc. of water was warmed slightly, and 8.7 g. (0.056 mole) of 4-chlorothiophenol was added. To the latter solution was added 7.5 g. (0.05 mole) of 3,6-dichloropyridazine, and the reaction mixture was refluxed for six hours. The reaction mixture was cooled and the crude solid material which had separated was collected by filtration, triturated with ether and dried, giving 9.4 g. of product, M.P. 138–140° C. The latter was recrystallized from 800 cc. of cyclohexane, giving 5.6 g. of 3,6-bis(4-chlorophenylmercapto)pyridazine, M.P. 150–150.5° C.

*Analysis.*—Calcd. for $C_{16}H_{10}Cl_2N_2S_2$: Cl, 19.41; N, 7.67. Found: Cl, 19.51; N, 7.41.

EXAMPLE 6

3-chloro-6-(4-chlorophenylmercapto)pyridazine

The aqueous filtrate obtained from filtration of the crude 3,6-bis(4-chlorophenylmercapto)pyridazine obtained above in Example 5 was extracted with ether and the ether extracts were combined with the ether used to triturate the crude 3,6-bis(4-chlorophenylmercapto)pyridazine. The combined ether solution was extracted with 10% potassium carbonate solution which removed a small quantity of starting 4-chlorothiophenol. The ether layer was then washed with saturated aqueous sodium chloride, dried and concentrated, leaving 6.0 g. of colorless solid, M.P. 94–96° C. Evaporation of the cyclohexane mother liquors obtained from crystallization of the 3,6-bis(4-chlorophenylmercapto)pyridazine described above in Example 5 left 3.6 g. of the same material, M.P. 94.5–96° C. The two crops were combined and recrystallized first from pentane and then from heptane, giving 3-chloro-6-(4-chlorophenylmercapto)pyridazine in the form of colorless needles, M.P. 96.5–97.5° C.

*Analysis.*—Calcd. for $C_{10}H_6Cl_2N_2S$: N, 10.90; S, 12.47. Found: N, 10.73; S, 12.63.

EXAMPLE 7

*3,6-bis(2-carboxyphenylmercapto)pyridazine*

Thiosalicylic acid (17.2 g., 0.122 mole) was dissolved in a solution of 9.1 g. (0.224 mole) of sodium hydroxide in 90 cc. of water, 14.8 g. (0.1 mole) of 3,6-dichloropyridazine was then added, and the mixture was stirred with refluxing for seven hours. The reaction mixture was cooled, a trace of solid material was removed by filtration, and the filtrates were acidified strongly with dilute hydrochloric acid. The gummy product which separated gradually crystallized upon standing, and this was collected by filtration and recrystallized twice from 50% ethanol, using activated charcoal for decolorizing purposes, giving 16.3 g. of 3,6-bis(2-carboxyphenylmercapto)pyridazine. A sample of the compound decomposed at about 170° C. when immersed in a bath at 160° C., and the residue melted with darkening at about 203–205.5° C.

*Analysis.*—Calcd. for $C_{18}H_{12}N_2O_4S_2$: N, 7.29; S, 16.68. Found: N, 6.97; S, 16.49.

EXAMPLE 8

3-chloro-6-(3,5-dimethylphenoxy)pyridazine was prepared from 3,6-dichloropyridazine and aqueous sodium 3,5-dimethylphenoxide according to the manipulative procedure described above in Example 5. There was thus obtained an 88% yield of 3-chloro-6-(3,5-dimethylphenoxy)pyridazine, M.P. 132–134° C. A sample when recrystallized from cyclohexane was obtained in the form of colorless prismatic needles, M.P. 135–135.5° C.

*Analysis.*—Calcd. for $C_{12}H_{11}ClN_2O$: Cl, 15.11; N, 11.96. Found: Cl, 15.17; N, 11.92.

EXAMPLE 9

*3-chloro-6-(4-chlorophenoxy)pyridazine*

3,6-dichloropyridazine (14.8 g., 0.1 mole) and 15.5 g. (0.12 mole) of a 4-chlorophenol in one equivalent of 10% sodium hydroxide solution was refluxed for six hours. Upon cooling the reaction mixture, a solid separated and was collected by filtration. The aqueous filtrate was extracted with benzene and the solid product was dissolved in the benzene extracts. The benzene solution was dried over anhydrous sodium sulfate and concentrated in vacuo, giving 23.0 g. of 3-chloro-6-(4-chlorophenoxy)pyridazine, M.P. 99.5–101.5° C. A sample after two recrystallizations from cyclohexane was obtained in the form of colorless prisms, M.P. 120–121° C.

*Analysis.*—Calcd. for $C_{10}H_6Cl_2N_2O$: Cl, 29.32; N, 11.58. Found: Cl, 29.38; N, 11.39.

I claim:

1. A compound having the formula

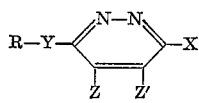

wherein R is a member of the group consisting of lower-alkyl, monocarbocyclic aryl, and monocarbocyclic aryl-lower-alkyl groups; Y is a member of the group consisting of oxygen and sulfur; X is a member of the group consisting of chlorine, bromine and Y'—R', wherein Y' is sulfur and R' is a member of the group consisting of lower-alkyl, monocarbocyclic aryl, and monocarbocyclic aryl-lower-alkyl groups; and Z and Z' are selected from the group consisting of hydrogen and lower-alkyl groups, and wherein the monocarbocyclic aryl groups of R and R' are selected from the group consisting of phenyl and phenyl substituted by from one to three substituents selected from the group consisting of lower-alkyl, lower-alkoxy, halogen and carboxy.

2. 3-lower-alkylmercapto - 6 - lower - alkylmercapto-pyridazines.
3. 3-chloro-6-lower-alkoxypyridazines.
4. 3,6-bis(methylmercapto)pyridazine.
5. 3,6-bis(2-carboxyphenylmercapto)pyridazine.
6. 3-chloro-6-methoxypyridazine.
7. The process for the preparation of compounds having the formula

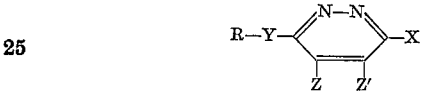

wherein R is a member of the group consisting of lower-alkyl, monocarbocyclic aryl and monocarbocyclic aryl-lower-alkyl groups; Y is sulfur; X is selected from the group consisting of chlorine, bromine and Y—R; and Z and Z' are selected from the group consisting of hydrogen and lower-alkyl groups, and wherein the monocarbocyclic aryl groups of R are selected from the group consisting of phenyl and phenyl substituted by from one to three substituents selected from the group consisting of lower-alkyl, lower-alkoxy, halogen and carboxy, which comprises heating a 3,6-di-halopyridazine having the formula

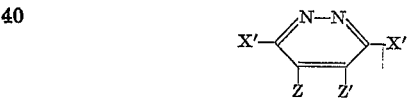

wherein X' is selected from the group consisting of chlorine and bromine with a compound having the formula R—Y—M wherein M is an alkali metal.

8. The process for the preparation of a compound having the formula

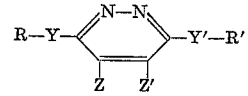

wherein R and R' are selected from the group consisting of lower-alkyl, monocarbocyclic aryl and monocarbocyclic aryl-lower-alkyl groups; Y is selected from the group consisting of oxygen and sulfur; Y' is sulfur; and Z and Z' are selected from the group consisting of hydrogen and lower-alkyl groups, and wherein the monocarbocyclic aryl groups of R are selected from the group consisting of phenyl and phenyl substituted by from one to three substituents selected from the group consisting of lower-alkyl, lower-alkoxy, halogen and carboxy, which comprises heating a compound having the formula

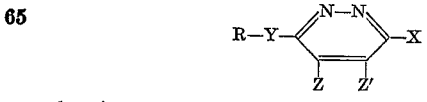

wherein X is selected from the group consisting of chlorine and bromine with a compound having the formula R'—Y'—M wherein M is an alkali metal.

9. The process for the preparation of 3,6-bis(lower-alkylmercapto)pyridazines which comprises heating 3,6-dichloropyridazine with at least two molar equivalents of an alkali metal lower-alkyl mercaptide.

10. The process for the preparation of 3-chloro-6-lower-alkoxypyridazines which comprises heating 3,6-dichloro pyridazine with about one molar equivalent of an alkali metal lower-alkoxide.

11. The process for the preparation of 3,6-bis(methylmercapto)pyridazine which comprises heating 3,6-dichloropyridazine with at least two molar equivalents of an alkali metal methyl mercaptide.

12. The process for the preparation of 3,6-bis(2-carboxyphenylmercapto)pyridazine which comprises heating 3,6-dichloropyridazine with at least two molar equivalents of an alkali metal salt of 4-chlorothiophenol.

13. The process for the preparation of 3-chloro-6-methoxypyridazine which comprises heating 3,6-dichloropyridazine with about one molar equivalent of an alkali metal methoxide.

14. 3-chloro-6-(4-chlorophenylmercapto)pyridazine.
15. 3-chloro-6-(3,5-dimethylphenoxy)pyridazine.
16. 3-chloro-6-(4-chlorophenoxy)pyridazine.
17. 3,6-bis(4-chlorophenylmercapto)pyridazine.

References Cited in the file of this patent
UNITED STATES PATENTS 2,764,584    Druey ------------------ Sept. 25, 1956